May 18, 1926.
J. BRANDSTETTER
VEHICLE CLEANER
Filed May 12, 1924
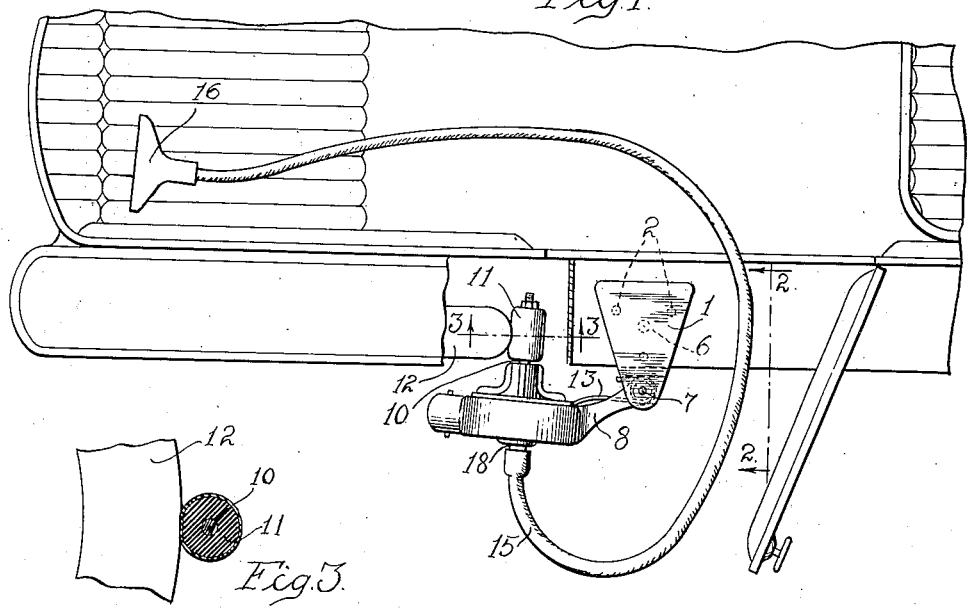
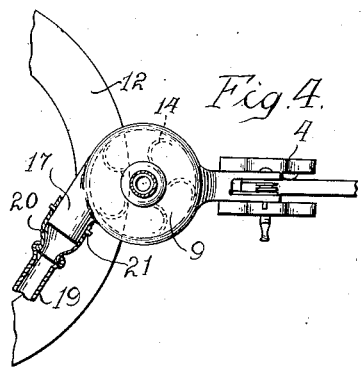
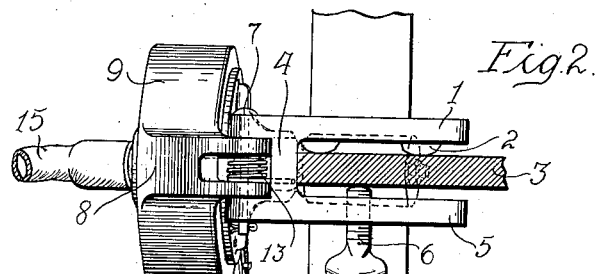
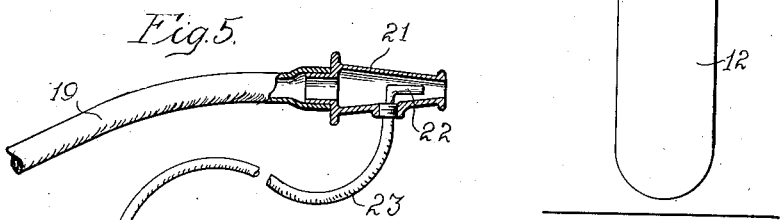
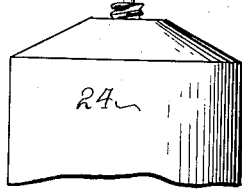
Inventor:
Josef Brandstetter
by Albert Scheible
Attorney Patented May 18, 1926.

1,584,725

UNITED STATES PATENT OFFICE.

JOSEF BRANDSTETTER, OF CHICAGO, ILLINOIS.

VEHICLE CLEANER.

Application filed May 12, 1924. Serial No. 712,516.

My invention relates to appliances suitable for use in the cleaning of automobiles and more particularly to an appliance of this kind adapted to be operated from a driving wheel of the vehicle and designed so that it can be readily taken along on the trips of the user, and one which may be employed interchangeably for producing either suction or a blast of air. In my copending application No. 697,234, filed March 6, 1924, on a vacuum cleaner attachment for automobiles I have shown a suction appliance of this general class constructed so that it can be supported from the running board of the automobile and can be operated from the adjacent rear driving wheel. In that case, the main portion of the appliance (namely the suction fan and casing as well as the shaft and the wheel-engaging drive pulley) were all supported by an arm pivoted on a horizontal axis to the clamp which supports this portion of the appliance from the running board, the arm extending obliquely downward and being swung towards the adjacent rear driving wheel by a suitable spring.

While the appliance disclosed in my said copending application has proven satisfactory in various tests, I have found that the use of suction is not entirely adequate for some of the purposes for which an air-moving cleaning appliance can advantageously be employed in cleaning a vehicle. For example, even if the suction nozzle employed with such an appliance is relatively thin, this may not be able to get into the crevices of portions of the upholstery or between the seat cushions and the seat backs sufficiently to extract the dust, leaves or the like which readily accumulate in such parts of the vehicle. On the other hand, an air blast would readily dislodge the accumulation from such vehicle portions and hence would be employed to good advantage. So also, an available air blast would serve other highly desirable purposes, such as that of affording convenient means for spraying oil upon various parts of the engine so as to clean the latter.

My present invention aims to provide means which will be equally suitable for suction cleaning and for use in cleaning operation requiring an air blast. For these combined purposes my invention aims to provide an air-moving appliance designed for attachment to an automobile and adapted to be actuated with equal facility in either direction from a driving wheel of the automobile so as to produce either a suction or an air pressure through an attached hose. While the fan of the appliance shown in my said copending application might be operated also in the reverse direction by merely reversing the engine, the disposition of the pivoted arm in that case is such that a reversing of the wheel direction would tend to swing the arm upwardly so as to jam it, and any variations or irregularities in the tire of the wheel might easily carry this jamming to such a point as to damage the appliance.

In my present invention I aim to overcome a part of these objections by arranging the mounting for the wheel-driven fan so that this is pivoted on a vertical axis, thereby enabling the fan to be driven with equal facility in either direction while still permitting simple spring means to compensate for any variations in the diameter of the driving wheel, for roughness or irregularities in the latter, and for the variations in the position in which the supporting clamp of the appliance it attached to the running board. Furthermore, my invention provides an arrangement in which the main or movable part of the appliance is supported from the attaching clamp independent of the compensating spring, thereby permitting a lighter spring to be used to good advantage. I also aim to overcome other obstacles by providing a convenient blower hose connection for the outlet of the fan casing which serves as the discharge port when the fan device is used for creating suction. Still further and also more detailed objects of my invention will appear from the following specification and from the accompanying drawings, in which—

Fig. 1 is a fragmentary horizontal section through the rear right hand portion of an automobile, showing an embodiment of my invention as it appears when in use as a vacuum cleaner.

Fig. 2 is an enlarged vertical section taken transversely of the car along the line 2—2 of Fig. 1.

Fig. 3 is an enlarged and fragmentary section taken transversely through the driving pulley of my appliance.

Fig. 4 is an elevation of my appliance showing this as used for blowing air through the hose, the hose and its connections to the fan casing being in section.

Fig. 5 is a partial sectioned view showing an oil atomizer attached to the flexible hose of my appliance for use in spraying oil with the same when my appliance is used as a blower.

In the embodiments of the drawings, the vehicle cleaner of my invention has as its supporting element a clamp including an upper web 1 carrying three downwardly projecting leather feet 2 adapted to rest on the top of the running board 3, this upper web 1 being connected by a riser web 4 to a lower web 5 which is spaced from the feet 2 by a distance somewhat greater than the thickness of the running board. Threaded through the bottom webs 5 is a thumb-screw 6 adapted to engage the bottom of the running board 3 so as to secure the clamp rigidly to this running board, this thumb-screw being desirably spaced opposite the center of the triangle formed by the axes of the three leather feet, as shown in Fig. 1.

Pivotally connected to the clamp 4 upon a vertical pivot pin 7 is an arm 8 which is rigidly secured to a fan casing 9, and this fan casing houses a rotatable fan 14 shaped after the usual manner in relation to the shape of the casing 9 so that the rotation of the fan will produce a forcible movement of air from one to the other of the usual two openings or ports in such a fan casing. The rotatable fan 14 is fastened to a shaft 10 which extends beyond the fan casing 9 laterally inward of the automobile and which has fastened to it a resilient driving pulley 11. In arranging the parts after this manner, I proportion them so that the driving pulley 11 will be adjacent to the periphery of the tire 12 of the adjacent rear driving wheel of the automobile when the clamp is attached to the running board after the manner above described. I also desirably provide the clamp with a portion (such as the inner edge of the riser 4 of the clamp) adapted to engage the outer edge of the running board so as to limit the sliding of the clamp towards the adjacent side of the car and so as to positively guide the clamp into a position in which the pulley 11 will be properly opposite the tire or wheel rim 12.

Furthermore, I interpose suitable resilient means, such as a coiled spring 13, between the said clamp and the fan casing, the spring being arranged so that it continuously tends to swing the movable portion of the appliance about the vertical pivot pin 7 in a direction urging the drive pulley 11 towards the tire 12 of the rear automobile wheel.

So also, I employ a drive pulley 11 of considerable resiliency, as for example by making it with a considerable thickness of a porous rubber interposed between the shaft 10 and an outer non-porous soft rubber rim portion.

With my appliance thus constructed and attached to an automobile after the manner shown in Figs. 1 to 3 inclusive, it will be obvious that when the adjacent rear driving wheel 12 is raised off the ground (or when the automobile is in a position where this wheel is over some depression in the floor or road) a starting of the engine will revolve the fan shaft. Hence the fan can readily be rotated in either direction according to the position of the reversing gear mechanism of the vehicle.

When my appliance is to be used as a vacuum cleaner, I attach a flexible hose 15 to the usual axial inlet of the fan casing after the manner shown in Fig. 1, so that the revolving of the fan will produce a suction through this hose. By providing any suitable vacuum cleaner nozzle, such as the nozzle 16 of Fig. 1, at the other end of the flexible hose and by using a hose of adequate length I can readily reach all interior portions of the vehicle so as to extract the accumulated dust and the like. This is then discharged through the outlet 17 of the can casing, for which purpose the said outlet desirably is disposed in a downward direction.

When my appliance is to be used for creating a blast of air, I detach the hose from the axial inlet 18 of the fan casing and leave this open to the outer air so that it serves as the inlet port of the casing. Then I attach a blower hose 19 to the downwardly directed opening of the fan casing which served as the discharge outlet of this casing when my appliance was operated for suction purposes. To facilitate such an attaching, I desirably provide the said outlet 17 with a pair of laterally projecting pins 21' adapted to interlock with corresponding bayonet slot formations on a reducing nipple 20 secured to the end of the hose 19. With the hose connection thus shifted a continuous blast of air will be produced through the hose 19, which blast can be employed either for blowing air into any crevices or passages to dislodge foreign matter from the latter, or for any other purpose to which an air blast readily lends itself. For example, I may connect the free end of the blower hose 19 to an atomizer nozzle 21 having a liquid nozzle 22 so disposed within the latter that the blast of air through the nozzle 21 will create a suction through this liquid nozzle. By connecting this liquid nozzle 22 to a hose 23 and dipping into a can 24 of oil, I cause the blast of air through the hose 19 to draw oil with it and to spray the same upon any object toward which the nozzle 21 is directed, thus adapting my device to the cleaning of automobile engines by means of a powerfully projected spray of oil.

When in use for either purpose, the resiliency of the driving pulley 11 will compensate automatically for minor irregularities in the periphery of the tire 12 of the driving wheel, while the spring 13 compensates for greater variations in this periphery, and also for variations in the position in which the clamp of the appliance is attached to the running board, the spring being highly responsive for this purpose since it is not called upon to support any part of the appliance. Owing to these automatic compensating means my appliance is readily adapted for use with widely varying types of automobiles and for operation by amateurs.

Furthermore, it will readily be seen that the entire appliance can easily be stored under a seat of the vehicle, so that the user can take it with him on his trips and can employ it for any of its various purposes easily and expeditiously and without the use of any tools whatever. However, while I have illustrated and described the vehicle cleaner of my invention in an embodiment having various highly desirable features of construction and arrangement, I do not wish to be limited to the particular details here disclosed, it being obvious that many changes might be made without departing either from the spirit of my invention or from the appended claims.

I claim as my invention:—

1. In a vehicle cleaner, a clamp having spaced jaws formed to receive the running board of the vehicle therebetween, an operating mechanism, a rigid horizontal arm connected at one end to said mechanism, the outer end of the clamp extending beyond the outer side edge of the running board and being forked, the other end of the arm being forked and received in the forked end of the clamp, a vertical pivot pin passed through said forked parts, actuating means for the operating mechanism engaged with the rear wheel of the vehicle, and a spring coiled about the pivot pin and engaged with the arm and with the clamp to hold the actuating means against the vehicle wheel.

2. In a vehicle cleaner, a horizontal body, means to secure the body to the running board of the vehicle, an operating mechanism having a casing, a rigid horizontal arm connected to the casing of the operating mechanism and engaged with the arm, actuating means carried by the operating mechanism engageable with the rear wheel of the vehicle, a vertical pivot pin pivotally connecting the arm to the body, and a spring coiled about the pin and engaged at its end with the arm and with the body so as to hold said actuating means engaged with the rear wheel of the vehicle.

3. In a vehicle cleaner, a horizontal body, means to secure the body to the running board of the vehicle, an operating mechanism having a casing, a rigid horizontal arm connected to the casing of the operating mechanism and engaged with the body, actuating means carried by the operating mechanism engageable with the rear wheel of the vehicle, a vertical pivot pin pivotally connecting the arm to the body, and spring means to hold the actuating means engaged with the rear wheel of the vehicle, said arm and thereby said mechanism being supported against downward movement by the body and pin independent of the spring means.

Signed at Chicago, Illinois, May 9th, 1924.

JOSEF BRANDSTETTER.